(12) United States Patent
Wiitala

(10) Patent No.: US 6,188,549 B1
(45) Date of Patent: Feb. 13, 2001

(54) MAGNETORESISTIVE READ/WRITE HEAD WITH HIGH-PERFORMANCE GAP LAYERS

(75) Inventor: James R. Wiitala, Pleasanton, CA (US)

(73) Assignee: Read-Rite Corporation, Milpitas, CA (US)

(*) Notice: Under 35 U.S.C. 154(b), the term of this patent shall be extended for 0 days.

(21) Appl. No.: 08/988,544

(22) Filed: Dec. 10, 1997

(51) Int. Cl.$^7$ .................................................. G11B 5/39
(52) U.S. Cl. ................................................................ 360/320
(58) Field of Search ................................... 360/113, 126, 360/317, 319, 320

(56) References Cited

U.S. PATENT DOCUMENTS

| | | | |
|---|---|---|---|
| 4,707,755 | 11/1987 | Ohta et al. | 360/114 |
| 4,853,815 | 8/1989 | Diepers | 360/126 |
| 5,057,955 | 10/1991 | Inagoya et al. | 360/121 |
| 5,084,795 | 1/1992 | Sakakima et al. | 360/120 |
| 5,262,915 | 11/1993 | Terunuma et al. | 360/120 |
| 5,350,628 | 9/1994 | Kugimiya et al. | 428/327.3 |
| 5,361,242 | 11/1994 | Chaya et al. | 369/13 |
| 5,439,754 | 8/1995 | Iwasaki et al. | 428/692 |
| 5,481,422 | 1/1996 | Okayama et al. | 360/120 |
| 5,523,986 | 6/1996 | Ishii | 369/13 |
| 5,617,071 * | 4/1997 | Daughton | 338/32 R |
| 5,644,455 | 7/1997 | Schultz | 360/113 |
| 5,771,141 * | 6/1998 | Ohtsuka et al. | 360/113 |
| 5,811,971 * | 9/1998 | Senda et al. | 324/244 |
| 5,849,422 * | 12/1998 | Hayashi | 428/611 |
| 5,905,611 * | 5/1999 | Yoda et al. | 360/113 |
| 5,930,084 * | 7/1999 | Dovek et al. | 360/113 |
| 5,930,086 * | 7/1999 | Chaug et al. | 360/113 |

FOREIGN PATENT DOCUMENTS

| | | |
|---|---|---|
| 5-205224 * | 8/1993 | (JP) . |
| 7-296337 * | 11/1995 | (JP) . |
| 10-228610 * | 8/1998 | (JP) . |
| 11-259822 * | 9/1999 | (JP) . |

\* cited by examiner

*Primary Examiner*—Jefferson Evans
(74) *Attorney, Agent, or Firm*—Mark Lauer

(57) ABSTRACT

High-performance amagnetic gap layers for electromagnetic transducers are thermally conductive and electrically insulative, as well as providing a dense amorphous surface for forming magnet resistive sensor elements. The amagnetic gap layers include nonmonocrystalline compounds of AlN, SiC, $SiO_2$, $Si_3N_4$, BeO and $Ta_2O_3$. The layers provide greatly increased thermal conductivity and breakdown voltage as compared with alumina, and are particularly suited for giant magnetoresistive and spin-valve heads.

17 Claims, 2 Drawing Sheets

MAGNETORESISTIVE READ/WRITE HEAD WITH HIGH-PERFORMANCE GAP LAYERS

TECHNICAL FIELD

The present invention relates to electromagnetic transducers or heads, and particularly to such transducers which employ a magnetoresistive effect for sensing signals.

BACKGROUND

The employment of magnetoresistive (MR) elements as sensors for electromagnetic transducers has led to improved performance of heads for disk and tape drives. As is well known, the resistance of an M element varies according to the magnetic field impinging upon the element, so that flowing an electric current through the element can be used to determine that magnetic field by measuring the change in resistance.

While bulk materials may exhibit some MR effect, such effects generally become more pronounced as an element becomes smaller relative to the applied electrical and magnetic flux. Thus it is known that films formed of materials such as Permalloy, which is an alloy of nickel and iron having a high permeability and low coercive force, are useful as sensors for heads when the film thickness is less than about 500 Å. Even thinner films exhibit quantum mechanical effects which can be utilized in devices such as spin valves for MR sensing. Higher storage density associated with smaller bit size also requires smaller MR elements.

Generally speaking, the thinner the film used for MR sensing, the more important that the film have a uniform thickness and structure. As such, the material surface or template upon which the film is formed is important. Heads for hard disk drives commonly include an MR sensor in a gap region located between or adjacent to a pair of magnetically permeable layers that are used for writing signals onto a disk. The conventional material forming the gap is alumina ($Al_2O_3$), which is known to be easy to form and work with, and which provides suitable template for forming thin MR films. Alumina, however, has a strong affinity for moisture and tends to form a columnar molecular structure, which is porous, both of which can undermine the quality and integrity of an adjoining MR sensor.

MR elements are also sensitive to a change in temperature, as such a change typically leads to a change in resistance, which can be misinterpreted as a change in magnetic flux or false signal. Thermal asperities caused by ephemeral contact between a head and disk, for example, can cause such signal errors, and for this reason it can be advantageous to thermally isolate an MR sensor. Higher magnetoresistance also generally implies increased heat generation by an MR film, however, and thus greater temperature increases during operation of the sensor. This higher operating temperature can also be deleterious to reading of signals.

SUMMARY OF THE INVENTION

The present invention employs an unconventional amagnetic material layer adjoining an MR sensor, the amagnetic layer designed to be thermally-conductive as well as electrically-insulative. Importantly, the amagnetic layer also provides a favorable surface upon which to form the delicate MR sensor. The amagnetic material is preferably an amorphous, solid oxide or nitride, such as AlN, SiC, $SiO_2$, $Si_3N_4$, BeO or $Ta_2O_5$. These compounds can be formed by semiconductor processing techniques and are less prone than alumina to damage during the processing of other layers. Formation of these compounds into amorphous layers provides an advantageous template for creation of MR films having a thickness as little as a few atomic layers. These layers are also dense and impervious to water or oxygen, common contaminants to MR elements.

The amagnetic nature of these materials is in sharp contrast to the adjoining MR element, allowing the materials to be employed as gap layers. The materials also have similar coefficients of thermal expansion to that of the delicate MR sensor, so that changes in temperature during formation or operation do not lead to excessive stress or rupture of the sensor. These materials also may have a higher breakdown voltage than alumina and are less porous, reducing the possibility of shorting the sensor or damage from electrostatic discharge (ESD). The imperviousness of these materials to electrical shorting affords the formation of very thin gap layers, which can improve the resolution of the MR sensor, and also typically affords greater heat conduction to nearby heat-sink layers. Due to this symbiotic combination of attributes, these materials are used as high-performance gap layers.

The use of high-performance gap layers can be in a simple MR sensor employing permanent magnet or antiferromagnetic pinning, canted current bias or soft adjacent underlayer for orienting the magnetization of the sensor to provide a useful signal. The high-performance gap layers can instead be used with an MR sensor employing multiple, thinner films, such as a giant-magnetoresistive (GMR) sensor, which has greater need for draining heat from the sensor. Even more advantageous is the use of the high-performance gap layers with a spin-valve (SP) sensor, which can require extremely thin films that generate a high signal and thus a high proportion of heat. The quantum mechanical operation of SP sensors may be deleteriously affected by excess heat, and thus can benefit from the thermal conductivity of the high-performance gap layers. Depending upon thickness and other criteria, the formation of the high-performance gap layers may be accomplished via ion beam deposition or magnetron sputtering for at least the most critical layers.

DETAILED DESCRIPTION

Figure 1:
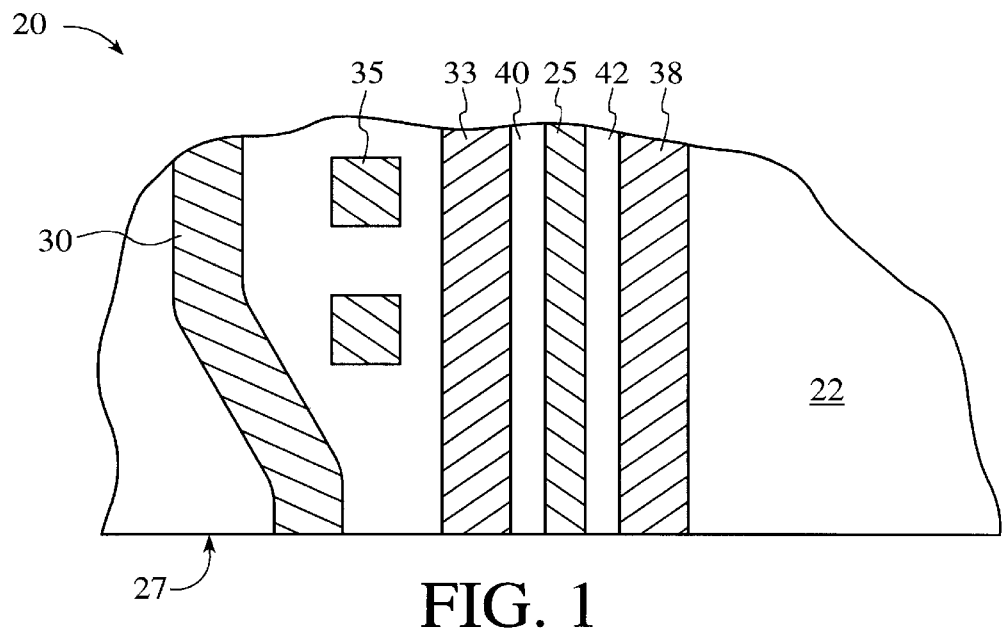
FIG. 1 shows a portion of a head including high-performance gap materials of the present invention.

Depicted in FIG. 1 is a transducer portion of a head 20 for reading and writing signals on a storage medium, such as a rigid disk. The transducer is formed by thin-film deposition and processing on a wafer substrate 22 along with thousands of similar transducers, not shown, before separation into individual heads. The head 20 includes an MR sensor 25 for reading of signals from a storage medium which will be located adjacent to a medium-facing surface 27 of the head. The head 20 also includes a pair of magnetically permeable layers 30 and 33, which are inductively driven by coils 35 for writing signals to the medium. The MR sensor 25 is magnetically shielded by a magnetically permeable layer 38, as well as by the layer 33 that is used for writing. Disposed between shield layers 33 and 38 and surrounding the MR sensor 25 are a pair of high-performance gap layers 40 and 42.

The high-performance gap layers 40 and 42 have a unique combination of attributes that ideally suit them for use with the MR sensor 25. First, the gap layer 42 provides a smooth, dense, low-stress surface for improving formation and thus performance of the sensor 25. Since the MR sensor 25 may be formed with layers as thin as a few atomic layers, the uniformity of the molecular template provided for forming those layers is critical. Second, the high-performance gap layers 40 and 42 have similar coefficients of thermal expansion to that of the MR sensor 25, so that changes in temperature during formation or operation do not lead to excessive stress or rupture of the sensor. Third, the high-performance gap layers 40 and 42 are thermally conductive yet electrically insulative and amagnetic, so that heat can drain from the sensor 25 to enhance its performance. By thermally conductive we mean materials having a thermal conductivity at least twice that of alumina. AlN, for example, has a thermal conductivity that is about seven times that of alumina, while the thermal conductivity of SiC is about three times that of alumina. BeO, on the other hand, has a thermal conductivity that is over ten times that of alumina. Since the high-performance gap layers are sandwiched between the MR sensor and the large metal shields that act as heat sinks, this ten-fold increase in thermal conductivity generally translates into a ten-fold improvement in draining heat from the sensor.

The high-performance gap layers 40 and 42 can be made from amorphous or other nonmonocrystalline compounds of AlN, SiC, $SiO_2$, $Si_3N_4$, BeO or $Ta_2O_5$. AlN and SiC appear to work particularly well. The compounds are not necessarily fully stoichiometric. For instance, a slight imbalance between aluminum and nitrogen atoms may be preferable [i.e., $Al_xN_{(1-x)}$, where $x \neq 0.5$], which can promote thermal conductivity, although it is important that this does not destroy the electrical insulation of the layers 40 and 42. The differing bond lengths of aluminum and nitrogen may promote formation of amorphous structures. On the other hand, SiC can be formed with a high thermal conductivity yet nonmonocrystalline structure that is electrically insulative even with large imbalances between the number of silicon and carbon atoms. It is possible, for instance, to gradually vary the concentration of silicon versus carbon in the layers 40 and 42, to obtain an amorphous, microcrystalline or polycrystalline surface adjacent to the MR sensor 25 in combination with a crystalline, highly thermally conductive structure further from the sensor. Similarly, any of the above compounds can be formed with an amorphous layer adjoining the sensor 25 for improved structural integrity of the sensor, and a crystalline layer further from the sensor for enhanced thermal conductivity.

Figure 2:
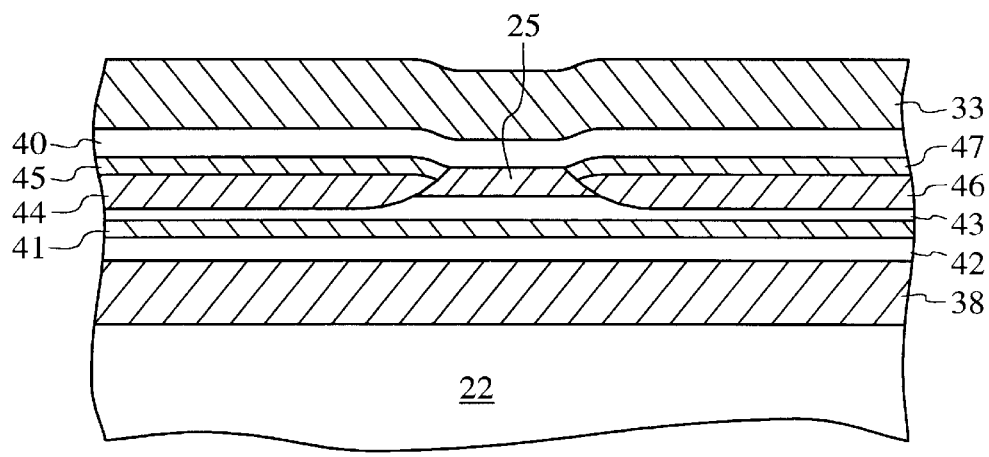
FIG. 2 shows some steps in the formation of the head of FIG. 1.

FIG. 2 details some of the steps involved in creating the head 20. A smoothly polished wafer substrate 22 is first provided, for which alumina is conventionally employed. In the current invention, however, the substrate 22 may alternatively be formed of a material similar to that of the high-performance gap layers, such as AlN or SiC, for thermal expansion matching. The magnetically permeable layer 38, preferably made of Permalloy, may then be formed directly upon the substrate 22, or a seed layer of Permalloy may first be sputtered on the substrate after which the remainder of layer 38 is electroplated. Layer 38 is then polished to a uniform thickness that may be between less than a micron and more than a few microns.

Atop the polished and clean shield layer 38 the first high-performance gap layer 42 is formed either by sputtering or ion beam deposition (IBD). Sputtering is typically faster and cheaper whereas IBD affords more careful control and uniformity of the layers. The layer 42 is preferably about 1000 Å in thickness for a simple MR sensor, for which sputtering may be adequate, while the higher signal strength of an SP sensor may call for an optimum thickness of layer 42 in a range between about 100 Å and 900 Å. Layer 42 is a nonmonocrystalline structure preferably of either AlN or SiC, which may include amorphous, polycrystalline and/or microcrystalline molecular structures. Layer 42 is also amagnetic, which includes diamagnetic as well as nonmagnetic materials. After deposition, layer 42 is lightly polished and cleaned to provide a smooth, nonporous surface for forming the MR sensor 25. The layer 42 is impervious to moisture and has a similar coefficient of thermal expansion to that of the sensor 25. The electrically insulative nature of 42 (and layer 40) includes a breakdown voltage that is substantially higher than that of alumina, particularly for layers with a thickness less than 1000 Å.

The MR sensor 25 is then formed on the high-performance gap layer 42 by IBE photolithography and etching, as described in U.S. Pat. No. 5,646,805 to Shen et al., which is assigned to the assignee of the present invention and incorporated by reference herein. Since photoresist processes use alkaline developing solutions that tend to rapidly etch alumina, the high-performance gap layer 42 provides a more durable and uniform surface for forming the sensor 25. Similarly, many of the etching chemicals used for tailoring the MR sensor 25 are either acids or bases, against which the high-performance gap layer 42 is much more durable than conventional hydrophilic alumina. The MR sensor can be a relatively simple trilayer structure employing a soft adjacent layer (SAL) for bias as shown in this embodiment, a similarly simple canted current bias structure, not shown, or a more complicated spin-valve sensor. In the present application, the term magnetoresistive (MR) sensor is meant to include sensing mechanisms that involve a resistance to electrical current flow that changes with the strength and/or direction of a magnetic field impinging upon the sensor, including for instance, giant magnetoresistive (GMR), colossal magnetoresistive (CMR) sensors or spin-valve (SP) sensors.

To form the simple MR sensor 25, a layer 41 of magnetically-permeable or soft Permalloy with a thickness of approximately 150 Å is initially formed by IBD on the gap layer 42, which is to provide a linearizing magnetic field to the sensor 25 due to electrical current shunted through the SAL 41. Atop the SAL 41 a spacer layer 43 is formed of a high-performance gap material with a thickness of approximately 800 Å at a central region adjacent to the MR sensor 25 and thinner elsewhere. A Permalloy sense layer is then formed and etched along with the spacer layer 43 to leave sloping sides for hard bias films 44 and 46. Electrical leads 45 and 47 are then formed atop the hard bias layers 44 and 46. The second high-performance gap layer 40 is then formed on the MR sensor 25 and leads 45 and 47, after which the remainder of the head is formed. Although conventional materials such as alumina can be used for the remainder of the amagnetic layers of the head, it is currently preferred to use essentially the same material as that forming the high-performance gap layers 40, 42 and 43.

Figure 3:
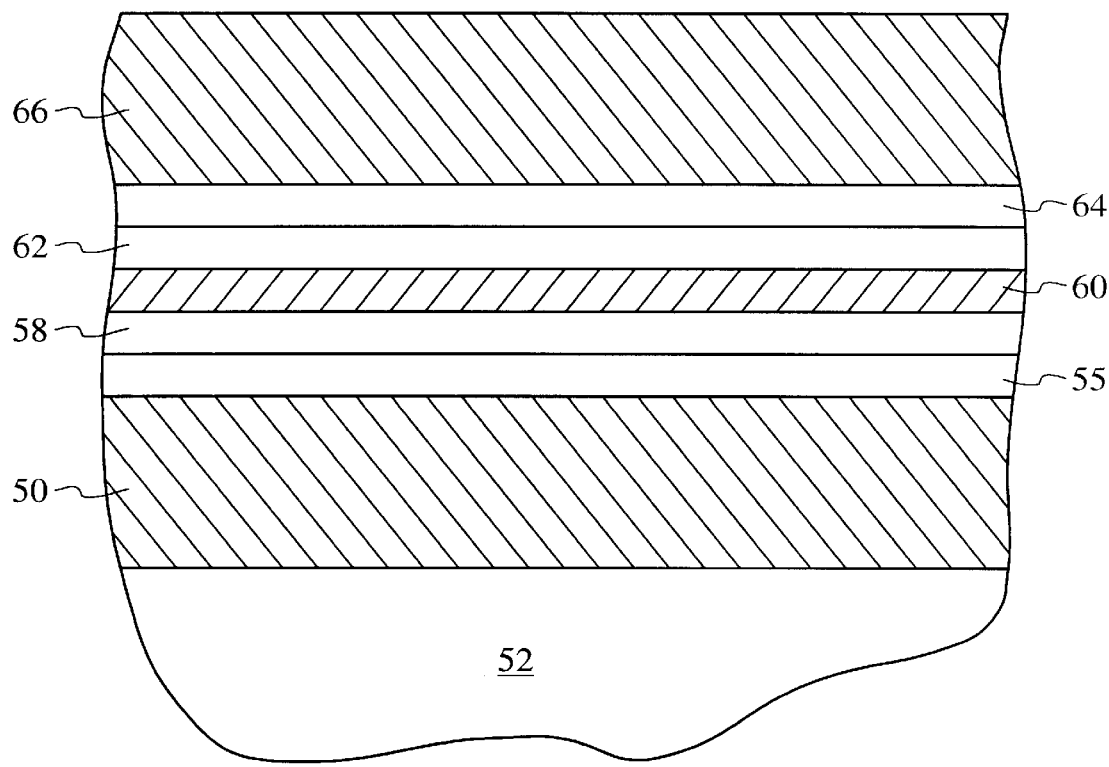
FIG. 3 shows some steps in the formation of a second embodiment of the present invention.

FIG. 3 shows the formation of paired layers of high-performance gap materials adjacent an SP sensor. A first magnetically-permeable shield layer 50 is formed atop a substrate 52, polished and cleaned by conventional processes. A first high-performance gap layer 55 is then formed to a uniform thickness of a few hundred angstroms. The first gap layer 55 may or may not be polished before formation of a second high-performance gap layer 58. After polishing and cleaning the second gap layer 58, an SP sensor 60 is then formed, as described in copending U.S. patent application Ser. No. 08/682,276, filed Jul. 17, 1996 and assigned to the assignee of the present invention, which is incorporated by reference herein. Although for brevity the sensor 60 is shown here as a single layer, in reality it is formed of several layers, some of which may be as thin as 5 Å to 10 Å. After the sensor 60 has been formed, another pair of high-performance gap layers 62 and 64 are formed, followed by another shield layer 66.

The use of plural adjoining high-performance gap layers 55 and 58 and/or layers 62 and 64 affords a number of useful configurations. Layers 55 and 64 may be formed of BeO and layers 58 and 62 formed of AlN, for instance. Alternatively, layers 55 and 64 may be amorphous while layers 58 and 62 are crystalline, with the amorphous layers 55 and 64 minimizing stress on the sensor 60 while the crystalline layers 58 and 62 maximizing thermal conductivity. Layers 55, 58, 62 and 64 are not necessarily of equal size, but may range in size from about 50 Å to about 1000 Å. During and after formation of the layers 55, 58, 62 and 64, materials from a one layer may diffuse into an adjoining layer. For example, layer 55 may be primarily SiC but may contain aluminum or nitrogen atoms from adjoining layer 58, which may likewise be primarily AlN but contain silicon or carbon atoms. Also useful, as mentioned above, is the formation of graded or nonstoichiometric compounds in any or all of the layers 55, 58, 62 and 64.

The high-performance gap layers of the present invention can be employed in read-only heads or combination read/write heads. For read/write heads the MR sensors and associated high-performance gap layers can be located within the same gap that is used for inductive writing, or can be disposed separately. In the latter case, the MR sensor can be formed either prior to or after the formation of the write elements. In any case, other amagnetic, electrically insulative layers are preferably formed of the same material as the high-performance gap layers, where the advantages of materials and process matching outweigh any disadvantages that may present themselves, for example due to thermal conductivity.

What is claimed is:

1. An electromagnetic transducer comprising:
   a magnetoresistive sensor disposed adjacent to a substrate, connected to a pair of sense conductors and having an opposed pair of major surfaces,
   a magnetically permeable layer disposed between one of said major surfaces and said substrate, and
   a thermally-conductive, electrically-insulative, amorphous and substantially hydrogen-free amagnetic layer disposed between said magnetoresistive sensor and said magnetically permeable layer and adjoining said one major surface, said amagnetic layer conducting heat but not electricity from said magnetoresistive sensor to said magnetically permeable layer.

2. The transducer of claim 1, wherein said amagnetic layer is made of a compound from the group consisting essentially of AlN, SiC, $Si_3N_4$, BeO and $Ta_2O_5$.

3. The transducer of claim 2, wherein said compound has a nonstoichiometric ratio of atoms.

4. The transducer of claim 1, wherein said amagnetic layer adjoins said magnetically permeable layer.

5. The transducer of claim 1, wherein said magnetoresistive sensor is a spin-valve sensor.

6. The transducer of claim 1, wherein said amagnetic layer is nonporous.

7. The transducer of claim 1, wherein said amagnetic layer has an amorphous structure adjoining said magnetoresistive sensor and a crystalline structure distal from said magnetoresistive sensor.

8. A head for reading or writing information on an associated medium, the head comprising:
   a strata of adjoined solid layers formed on a substrate, including a magnetoresistive sensor and a magnetically permeable shield layer disposed between said magnetoresistive sensor and said substrate, said strata including a plurality of electrically-conductive layers, a plurality of magnetic layers and a plurality of electrically-insulative, amagnetic layers, wherein one of said amagnetic layers is disposed between said sensor and said shield layer, adjoins said sensor, has an amorphous, substantially hydrogen-free structure, and includes a compound selected from a group of compounds including AlN, SiC, $Si_3N_4$, BeO and $Ta_2O_5$.

9. The head of claim 8, further comprising a thermally-conductive, electrically-insulative, amagnetic layer having a crystalline structure disposed between said shield and said one amagnetic layer.

10. The head of claim 8, wherein said substrate includes a material selected from said group of compounds.

11. The head of claim 8, wherein substantially all of said amagnetic layers are formed from said group of compounds.

12. The head of claim 8, wherein said compounds have nonstoichiometric ratios of atoms.

13. A head for an electromagnetic storage system, the head comprising:
   a substrate, and
   an electromagnetic transducer made on said substrate of a plurality of thin films including magnetic, electrically-conductive layers adjoining amagnetic, electrically-insulative, nonmonocrystalline layers, said transducer including a magnetoresistive sensor separated from said substrate by a magnetically permeable shield layer, wherein at least one of said amagnetic layers is composed of a compound selected from the group consisting essentially of AlN, SiC, $Si_3N_4$, BeO and $Ta_2O_5$.

14. The head of claim 13, wherein said compound has a nonstoichiometric ratio of atoms.

15. The head of claim 13, wherein said transducer is a spin-valve sensor.

16. The head of claim 13, wherein said compound is a metal oxide.

17. The head of claim 13, wherein said one of said amagnetic layers adjoins another of said amagnetic layers and at least one of said magnetic layers.

* * * * *